July 9, 1963

V. M. GWYTHER 3,096,600

FISH SORTING METHOD

Filed Oct. 13, 1960

VAL M. GWYTHER
Inventor
by CARVER & Co
Hugo Ray
Agent

July 9, 1963 V. M. GWYTHER 3,096,600
FISH SORTING METHOD

Filed Oct. 13, 1960 2 Sheets-Sheet 2

VAL M. GWYTHER
Inventor
by CARVER & CO
Hugo Ray
Agent

United States Patent Office

3,096,600
Patented July 9, 1963

3,096,600
FISH SORTING METHOD
Val M. Gwyther, 4686 W. 5th Ave., Vancouver 8,
British Columbia, Canada
Filed Oct. 13, 1960, Ser. No. 62,420
6 Claims. (Cl. 43—100)

My invention relates to improvements in fish sorting means.

During the early stages of their fresh water life salmon form the principal source of food for many other less valuable species of fish. The predators share a common spawning ground with the salmon and in order to reach the grounds are required to travel up the same rivers and streams as the migrating salmon.

The objects of the present invention are to provide means and a method whereby the several species of fish may be trapped as they proceed upstream so that the predators may be utilized according to their worth, while the salmon are either returned to the river unharmed, or are retained for purposes of hatching and the like.

A further and important object is to provide means whereby the sorting, classifying, and processing, may be conveniently carried out during the height of the fish migration.

Other objects will appear as the specification proceeds.

Referring to the accompanying drawing.

In the drawings like characters of reference indicate corresponding parts in each figure.

Figure 1:
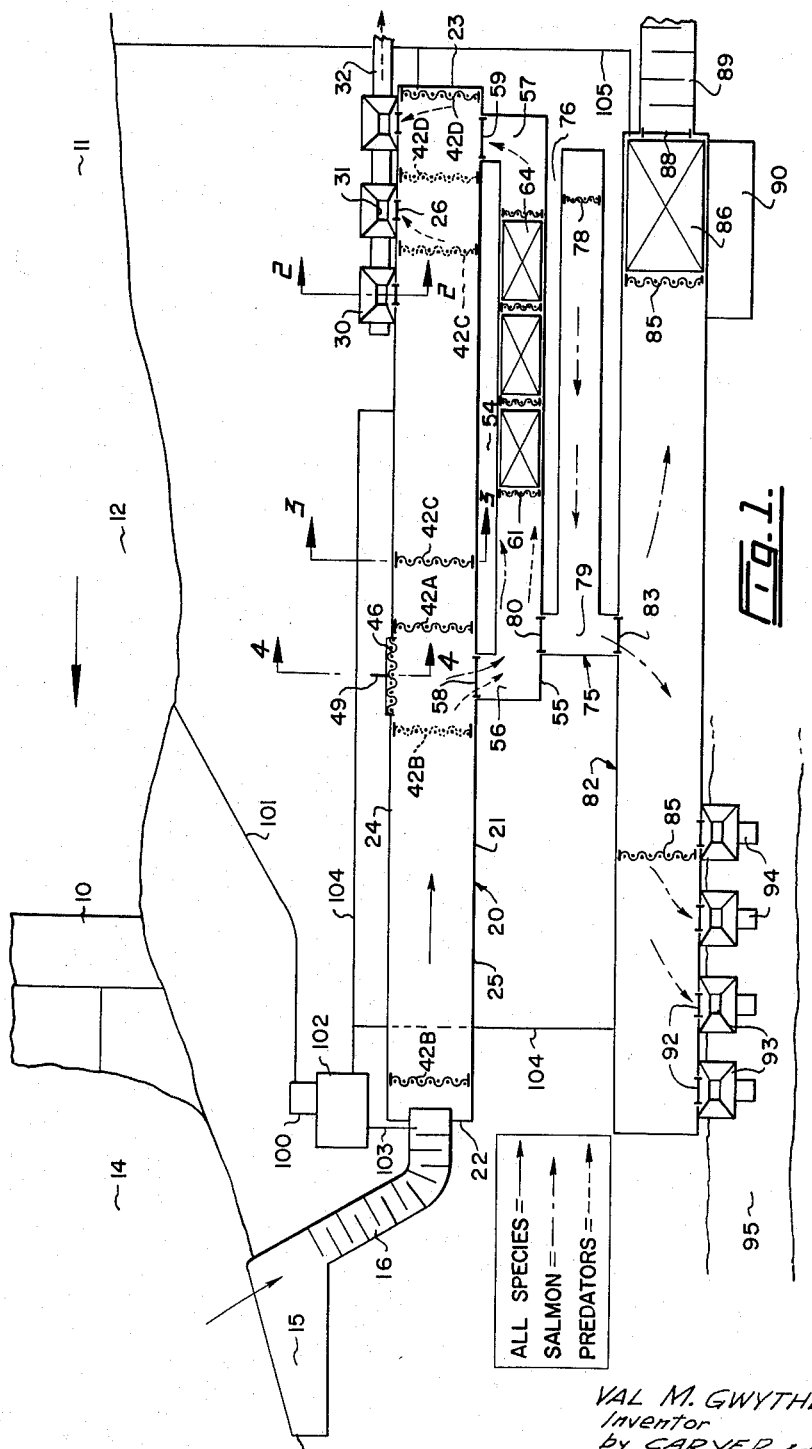
FIGURE 1 is a schematic view of the invention.

As shown schematically in FIGURE 1 the present structure is adapted to be erected close to a dam 10 which extends across a river 11 so as to form a storage lake 12. On the downstream side of the dam, a pool 14 is maintained at a predetermined level and partly immersed in said pool is the inlet chamber 15 of a fish ladder 16. The fish ladder slopes upwardly to a height of land disposed above the high water mark of the lake 12, and erected on this height of land adjacent the lake is a structure generally indicated by the numeral 20.

Figure 2:
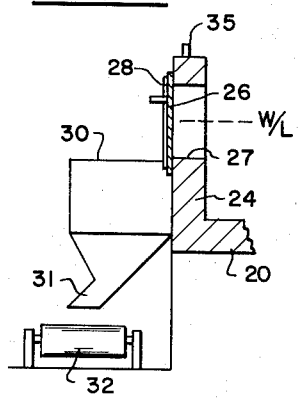
FIGURE 2 is a section taken on line 2—2 of FIGURE 1.

The structure 20 includes a large open-topped primary sorting tank 21 having end and side walls 22, 23, 24 and 25 respectively. The upper end of the fish ladder extends through the end wall 22 to communicate with the interior of the tank 21 and adjacent the end wall 23, the tank side wall 24 is provided with a number of suitably spaced gates 26. Each gate 26, see FIGURE 2, forms a closure for opening 27 and said gate is slidably mounted in vertical guides 28. The gates are adapted to provide access to exteriorly mounted hoppers 30 having outlets 31 which are disposed over a horizontal conveyor 32.

Figure 3:
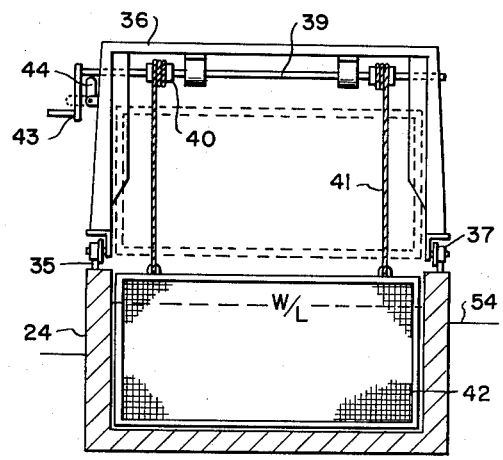
FIGURE 3 is a section taken on line 3—3 of FIGURE 1.

In FIGURE 3 it is shown that the side walls 24 and 25 of the tank 21 are fitted with rails 35 which serve to support a number of hoisting frames 36. The frames bridge the sorting tank and are fitted on each side with spaced wheels 37 which ride up the rails so that the frames may be moved without undue effort along the length of the tank. A shaft 39 is journalled in the upper part of each frame and is fitted with spaced drums 40 on which cables 41 are wound. The lower ends of the cables are secured to transverse screens 42 which closely fit the inner dimensions of the tank 21. A crank 43 fitted to the shafts 39 enables the screens to be raised from the solid to the dotted line position of FIGURE 3. Each frame may be fitted with a latch 44 adapted to engage the crank and retain the screen in a selected vertical position.

Figure 4:
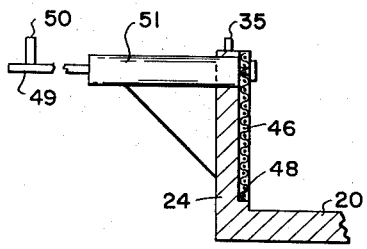
FIGURE 4 is a similar view taken on line 4—4 of FIGURE 1.

Intermediate the length of the tank 21 the side wall 24 is fitted with a longitudinal screen 46 which is shown in detail in FIGURE 4. The wall 24 is preferably recessed as at 48 to receive the screen which screen is fitted with a push-pull shaft 49 having a handle 50. A sleeve bearing 51 is carried by the wall 24 and the shaft 49 slidably extends through said sleeve bearing.

Extending parallel to the tank 21 and spaced therefrom by a walkway 54, is a relatively small secondary sorting tank 55. This smaller of the two tanks has end portions 56 and 57 which extend across to the wall 25. Gates 58 and 59 are fitted to the side wall 25 which, when raised, provide communication between the tank 21 and the end portions 56 and 57. The tank 55 has a plurality of screens 61 which are mounted in frames 62 in the same manner as before and are adapted for movement lengthwise of the tank. The screens 61 operate in conjunction with lifting trays 64 which have wire mesh bottom and side walls, the side walls being relatively low to provide easy access to the contents of the tray.

Figure 5:
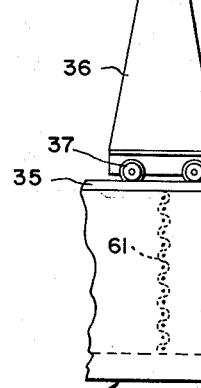
FIGURE 5 is a fragmentary side elevation showing the preferred mounting of the lifting trays.
Figure 5:
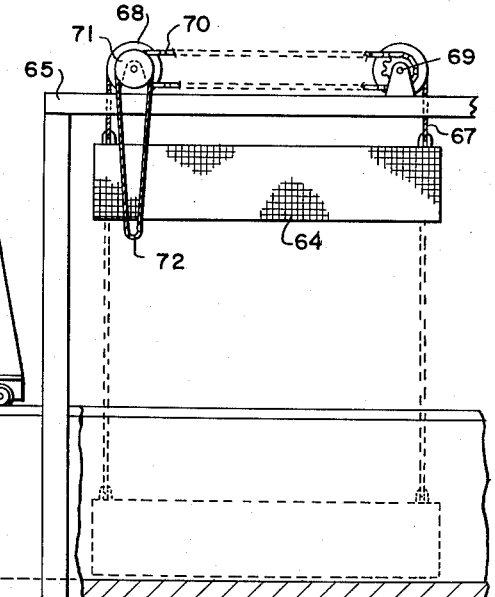

As shown in FIGURE 5 the lifting trays 64 are mounted in an open framework 65 which straddles the tank 55 so as to provide an unobstructed passage for the screens 61 and their wheeled frames. Each tray is suspended from the framework by means of cables 67 which are trained over drums 68 and said drums are mounted on transverse shafts 69 which are suitably journalled on the framework. The shafts 69 of each tray are sprocket and chain connected as at 70 and one of the shafts is fitted with a pulley 71 over which an endless cable 72 is trained. By manipulation of the cable 72 the tray may be raised from the solid to the dotted line positions of FIGURE 5.

The structure 20 also includes a first storage tank 75 which is spaced from the tank 55 by a working area or walkway 76. A screen 78 is mounted in the tank 75 in the same manner as the previously described screens and is adapted to travel along the tank towards and away from the end portion 79 of said tank. The portion 79 connects the tank 75 to the secondary sorting tank and movement therebetween is controlled by means of a gate 80.

Alongside the tank 75 a relatively large second storage tank 82 is positioned and communication between the two storage tanks is by means of the end portion 79 controlled by a gate 83. The tank 82 is fitted with travelling screens 85 and a lifting tray 86 both of which are as previously described. One end wall of the second storage tank has a gate 88 which leads to a fish ladder 89 and adjacent the tray 86 a platform 90 is provided on the exterior of the storage tank. The opposite end of the tank 82 has a plurality of spaced gates 92 which lead to loading hoppers 93 and the outlets 94 of said hoppers are disposed over a roadway 95. The several gates, screens and lifting trays of the present structure are here shown as being manually operated, but it will be understood that these parts could be operated by some simple power driven means without departing from the scope of the invention.

Water is supplied to the structure 20 by means of a pumping station 100 which draws water from the lake 12 through a pipe 101 and feeds it to a storage tank 102. A pipe 103 from the storage tank supplies sufficient water to the ladder 16 to enable fish to make their way therethrough without difficulty. Other pipes 104 supply water to the several tanks but this water need only be sufficient in volume to ensure satisfactory sanitary conditions within the structure. Waste water is conducted back to the lake through pipes 105. It will be understood that all gates in the several tanks other than the gates 26 and 92 are of pervious material so as to maintain a common level of water in the structure 20.

As the migrating fish make their way upstream and find the route blocked by the dam 10, they gather in the pool 14 and instinctively enter the fish ladder 16 to reach the tank 21. Prior to the first fish entering the tank, a screen 42A is lowered into place to the right of the gate 58 as viewed in FIGURE 1 and the mesh of this screen is such that the small fish which are mainly predators may pass therethrough while the larger salmon and predators cannot. However fish of all sizes and species will collect in the tank to the left of the screen 42A and when a sufficient number are present a second screen 42B is lowered into the tank near the end wall 22. The screen 42B of relatively fine mesh, is slowly moved to the right which movement reduces the volume of water in which the fish are confined until they are concentrated in the vicinity of the gate 58.

Many of the small fish will pass through the screen 42A although some will remain with the concentration of large fish. A screen 42C is entered into the tank near the screen 42A and is moved toward the end wall 23. Near the wall 23 a similar screen 42D is placed in position and is moved towards screen 42C so the fish are concentrated near one of the hoppers 30. The gate 26 to this hopper is opened and the fish are discharged on to the moving conveyor 32. The conveyor moves the small fish to a point where further sorting may take place. For example, the edible fish may be transported for market sales while the remainder may be conveyed to a reduction plant for processing to fish meal.

The large fish concentrated between the screens 42A and 42B are moved to the tank 55 by opening the gate 58 and moving the screen 46 across the tank 21 so that the fish are forced to enter the end portion 56 whereupon said gate is closed.

In the tank 55 a screen 61 is first placed in position near the end portion 57 and a tray 64 is lowered to the bottom of the tank alongside this screen. A second screen 61 is entered into the water an appropriate distance to the left of the first screen and is moved along the tank to gather the fish above the tray. Other screens and trays are manipulated in this manner until all the large fish are collected in batches which may be raised by means of the trays.

The bottom wall of each tray has a mesh size which will permit the smaller predators to pass through the tray so as to remain in the tank while the larger predators and salmon are contained within said tray. Thus, when each tray in turn is raised to substantially the level of the water in the tank, the large fish only are presented to the workmen standing in the walkway 76 so that the predators may be sorted from the desired species. The workmen toss the predators back into the tank 55 to the right of the first positioned screen 61 and the salmon are transported to the tank 75. When all the trays have been cleared in this manner the trays are raised to their uppermost positions, the gate 59 is opened and a screen 61 is used to move all the predators from the tank 55 to the right end of the tank 21. From the tank 21 the fish are passed to the conveyor 32 in the manner previously described.

The salmon contained within the first storage tank 75 are cleared away by opening the gate 83 and moving the screen 78 from right to left to transport the fish to the second storage tank 82.

The tank 82 has a number of uses in addition to serving as a storage space for the salmon. If, for example, the fish are to be allowed to return to the river 11 through the fish ladder 89, the gate 88 is opened to provide an exit from the tank. In some cases it is expedient to transport the fish to the river by tank truck and the tank provides convenient means for loading the vehicles. The trucks are moved up to the structure along the roadway 95 and are positioned beneath the outlets 94 of the hoppers 93. The fish are then loaded into the trucks by manipulation of the gates 92 and one or both of the traveling screens 85.

Salmon eggs are sometimes taken from migrating fish for incubation in a hatchery in which case the tank 82 serves to house the fish until such time as the eggs are ripe for removal. A screen 85 is operated in conjunction with the tray 86 to raise the fish so that they can be seized by workmen standing on the platform 90. After removal the eggs are transported to a hatchery which may be conveniently located close to the tank 82 and the waste fish are transported to the reduction plant. It will be noted that after the migratory run of the fish is over, the tank 82 may be used to rear the young fish to a stage where they can be loaded into tank trucks and be taken to the rearing areas which are now free from predators.

The embodiments of the invention in which an exclusive property or privilege is claimed are defined as follows:

1. The method of removing all fish except a desired species from a river during migration upstream past an obstruction which method comprises: guiding the fish from the downstream side of the obstruction into a water-filled structure, moving a first screen along the structure towards a second screen to reduce the volume of water containing the fish, to separate some of the fish below a predetermined size from the remainder of the fish and to collect the remainder of the fish above a lifting tray, raising the lifting tray until the fish therein are accessible from the exterior of the structure, hand selecting the desired species from the fish in the lifting tray for transfer to another part of the structure and transporting the desired species in the other part of the structure back to the river on the upstream side of the obstruction.

2. The method of removing all fish except a desired species from a river during migration upstream past an obstruction which method comprises: guiding the fish from the downstream side of the obstruction into a water-filled structure, moving a first screen along the structure towards a second screen to reduce the volume of water containing the fish and to separate some of the fish below a predetermined size from the remainder of the fish, further reducing the volume of water containing the remainder of the fish by similar screen movement to separate substantially all of the fish below said predetermined size from the remainder of the fish and to locate the remainder of the fish above a lifting tray, raising the lifting tray so that the fish therein are accessible from the exterior of the structure, hand selecting the desired species from the fish in the lifting tray for transfer to another part of the structure and transporting the desired species in the other part of the structure back to the river on the upstream side of the obstruction.

3. The method of removing all fish except a desired species from a river during migration upstream past an obstruction in the river which method comprises: guiding the fish from the downstream side of the obstruction into a water-filled structure including a primary sorting tank, a secondary sorting tank and a storage tank, moving a first screen along the primary sorting tank towards a second screen to reduce the volume of water containing the fish and to separate some of the fish below a predetermined size from the remainder of the fish, transferring the remainder of the fish from the primary to the secondary sorting tank, similarly moving secondary sorting tank screens to reduce water volume and separate substantially all of the fish below said predetermined size from the remainder of the fish, moving the secondary sorting tank screens to further reduce water volume and to collect said fish above a lifting tray, raising the lifting tray so that the fish therein are accessible from the exterior of the structure, hand selecting the desired species from the remainder of the fish in the lifting tray for transfer to said storage tank and transporting the desired species in the storage tank back to the river on the upstream side of the obstruction.

4. The method of removing all fish except a desired species from a river during migration upstream past an obstruction in the river which method comprises: guiding the fish from the downstream side of the obstruction into a water-filled structure including a primary sorting tank, a secondary sorting tank and a storage tank, moving a first screen along the primary sorting tank towards a second screen to reduce the volume of water containing the fish and to separate some of the fish below a predetermined size from the remainder of the fish, moving a third screen lengthwise of the primary sorting tank to collect the fish below the predetermined size at one end of said tank, transferring the remainder of the fish from the primary to the secondary sorting tank, similarly moving first and second secondary sorting tank screens to reduce water volume and separate substantially all of the fish below said predetermined size from the remainder of the fish, moving said secondary tank screens to further reduce the volume of the water containing the remainder of the fish and to collect said fish above a lifting tray, raising the lifting tray so that the fish therein are accessible from the exterior of the structure, hand selecting the desired species from the remainder of the fish in the lifting tray for transfer to said storage tank and transporting the desired species in the storage tank back to the river on the upstream side of the obstruction.

5. The method of removing all fish except a desired species from a river during migration upstream past an obstruction in the river which method comprises: guiding the fish from the downstream side of the obstruction into a water-filled structure including a primary sorting tank, a secondary sorting tank and a storage tank, moving a first screen along the primary sorting tank towards a second screen to reduce the volume of water containing the fish and to separate some of the fish below a predetermined size from the remainder of the fish, moving a third screen lengthwise of the primary sorting tank to collect the fish below the predetermined size at one end of said tank, transferring the remainder of the fish from the primary to the secondary sorting tank, moving secondary sorting tank screens to separate substantially all of the fish below said predetermined size from the remainder of the fish, transferring the fish below the predetermined size from the secondary sorting tank to the said end of the primary sorting tank, reducing the volume of water containing the remainder of the fish in the secondary sorting tank by screen movement to collect said fish above a lifting tray, raising the lifting tray to dispose the remainder of the fish at substantially the level of the water in the secondary sorting tank, hand selecting the desired species from the remainder of the fish in the lifting tray for transfer to said storage tank and transporting the desired species in the storage tank back to the river on the upstream side of the obstruction.

6. The method of removing all fish except a desired species from a river during migration upstream past an obstruction in the river which method comprises: guiding the fish from the downstream side of the obstruction into a water-filled structure including a primary sorting tank, a secondary sorting tank and a storage tank, moving a first screen along the primary sorting tank towards a second screen to reduce the volume of water containing the fish and to separate some of the fish below a predetermined size from the remainder of the fish, moving a third screen lengthwise of the primary sorting tank to collect the fish below the predetermined size at one end of said tank, transferring the remainder of the fish from the primary to the secondary sorting tank, moving secondary sorting tank screens to separate substantially all of the fish below said predetermined size from the remainder of the fish, transferring the fish below the predetermined size from the secondary sorting tank to the said end of the primary sorting tank, reducing the volume of water containing the remainder of the fish in the secondary sorting tank by screen movement to collect said fish above a lifting tray, raising the lifting tray to dispose the remainder of the fish at substantially the level of the water in the secondary sorting tank, hand selecting the desired species from the remainder of the fish in the lifting tray for transfer to said storage tank, transporting the desired species in the storage tank back to the river on the upstream side of the obstruction and discharging all the fish remaining in the structure for further processing.

References Cited in the file of this patent
UNITED STATES PATENTS

| 769,910 | Melbye | Sept. 13, 1904 |
| 2,643,481 | Ederer | June 30, 1953 |

OTHER REFERENCES

Engineering News Record of Aug. 14, 1958, pp. 46, 47 and 48.